C. M. MOHLER.
SHOCK ABSORBER.
APPLICATION FILED AUG. 19, 1920.
1,388,742. Patented Aug. 23, 1921.
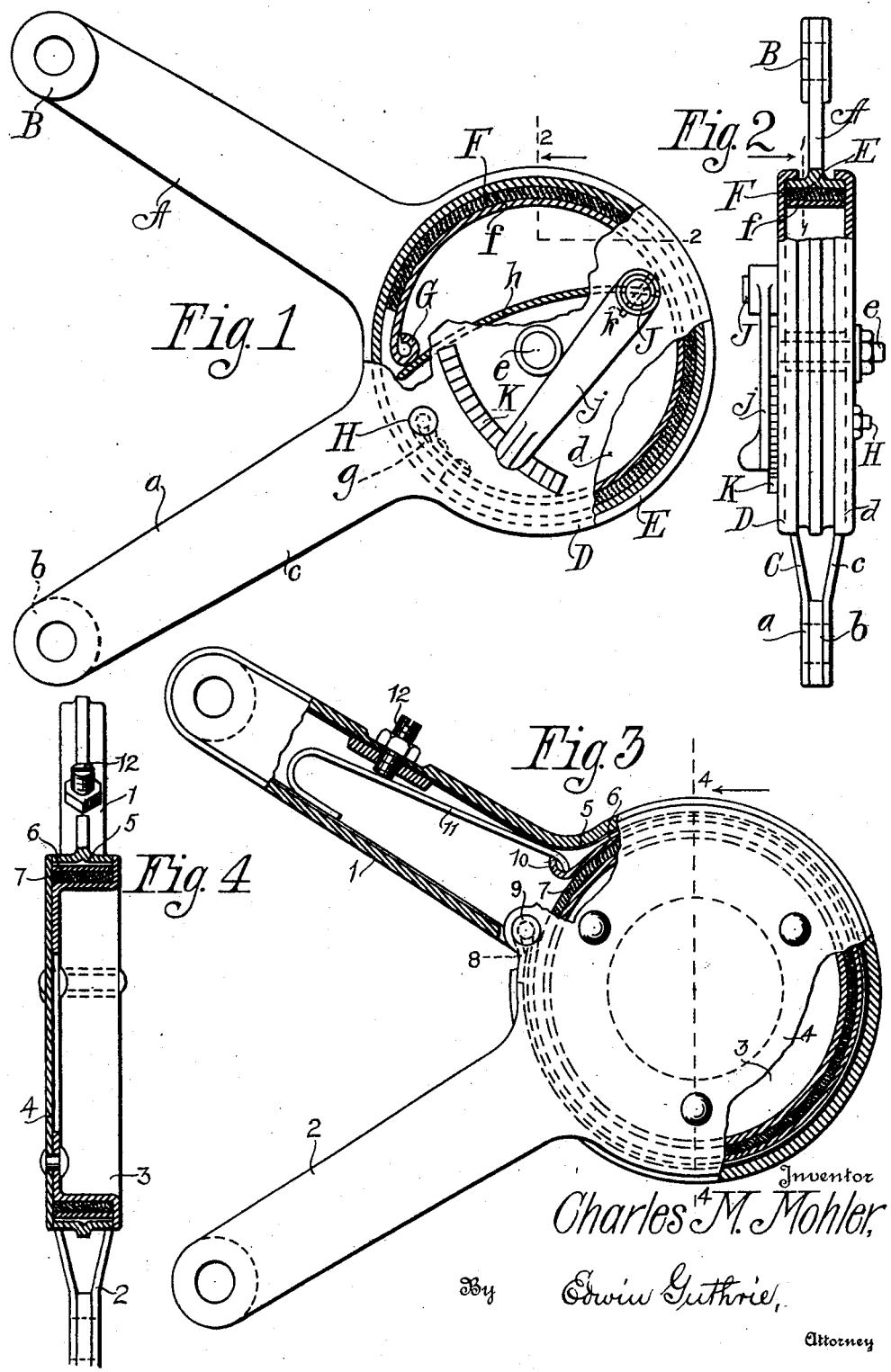
Charles M. Mohler,
By Edwin Guthrie,
Attorney

UNITED STATES PATENT OFFICE.

CHARLES M. MOHLER, OF RICHMOND, INDIANA.

SHOCK-ABSORBER.

1,388,742.  Specification of Letters Patent.  Patented Aug. 23, 1921.

Application filed August 19, 1920. Serial No. 404,695.

*To all whom it may concern:*

Be it known that I, CHARLES M. MOHLER, citizen of the United States, residing at Richmond, in the county of Wayne and State of Indiana, have invented certain new and useful Improvements in Shock-Absorbers, of which the following is a specification.

This invention relates to shock absorbers of the "snubber" type, for application to the springs and frames of vehicles, especially automobiles, to take up or retard the jolt and rebound created by suddenly encountering a depression or obstacle in the roadway.

For its object this invention has the production of a device of the nature stated, having parts of special construction and arrangement whereby it is believed the unpleasant disturbances experienced by riders in motor vehicles due to unexpected and more or less violent movements of such machines when driven over poor roads are materially mitigated.

In the accompanying drawings the construction and arrangement of the various parts of this invention are illustrated. Fig. 1 represents a side view of all parts assembled, superficial portions being removed as upon the broken line 1—1 of Fig. 2, to disclose interior members. Fig. 2 is a rear view of the whole as shown in Fig. 1, with an upper portion of the body or box broken away upon the indirect dotted line 2—2 of Fig. 1. Fig. 3 is a side view of a modification of this invention showing all parts assembled, and Fig. 4 is a vertical section upon the broken line 4—4 of Fig. 3.

Throughout the drawings and description the same character is employed to refer to the same part.

Considering Figs. 1 and 2, there are shown two arms A and $a$, disposed angularly or divergently, and provided at their outer ends with bosses B and $b$ whereby the arms may be bolted pivotally to the frame and spring of a vehicle. The arm referred to generally by the letter $a$ comprises two side pieces C and $c$ and the side pieces are connected with the two circular members D and $d$. The arm A is connected with an annular member E, and when the two circular or side members D and $d$ are joined together by means of the spacing center bolt $e$, the annular member E is held movable between the flanged edges of the circular members. As the arms are moved the members D, $d$ and E are correspondingly rotated. Those members when assembled form a flat, cylindrical box as best set out in Fig. 2.

Within the box formed by the annular and circular members and arranged against the inner and cylindrical wall of the member E is a friction strip F made of any selected material such as the frabric used for brake linings, and against the friction strip is arranged a friction spring $f$. The friction spring has one free end G, and an end $g$ attached to the rivet H that passes through the circular members mentioned. In contact with the free end G of the friction spring $f$ is a flat tension or pressure spring $h$, and the end of the tension spring is passed through the pivot post J of the adjustable arm $j$, carried by the circular member D, and having its movable end engaging the curved ratchet bar or rack K. The end of the tension spring $h$ is secured in place in the post J by a pin $k$ passing through the post and through the end of the spring. It is believed to be discernable from the drawing that the movement of the adjustable arm J into engagement with different portions of the ratchet arc or bar K will vary the force exerted by the tension spring $h$ upon the free end G of the friction spring $f$.

Figs. 3 and 4 illustrate a modified form of this invention. The angularly disposed or divergent arms 1 and 2 are connected with rotary body members as before, the construction being different. The arm 2 is connected with a circular member comprising the external disk 4 and an inner flanged cup 3 riveted to the disk. Those two pieces form a single member rotated by the arm 2. Between the pieces 3 and 4 as they are assembled is placed the ring or short cylinder 5, rotated by arm 1 attached thereto. Next within the ring 5 is the friction spring 6, and between the spring 6 and the outer cylindrical surface of the cup 3 is arranged the friction strip 7. As best shown in Fig. 3, one end 8 of the friction spring 6 is secured by the rivet 9 to the external circular plate 4, which has a suitable extension for that purpose, and the free end 10 of the friction spring 6 engages the end of a tension spring 11 located within the hollow arm 1 as illustrated. The tension of the spring 11 and the consequent force with which it bears upon the free end of the friction spring may be varied by means of the set screw 12.

In the operation of this invention, considering Figs. 1 and 2, assume an obstruction to be suddenly met with causing the arm *a* to move upwardly, that is to say, having the effect of moving the two arms toward each other. The ends of the friction spring *f* are brought toward each other and the pressure upon the friction strip F lessened, and the effect of the sudden jolt is correspondingly cushioned and the riders in the vehicle are in a degree protected from the full force or shock. On the rebound of the vehicle spring the arms separate, and the ends of the friction spring separate also. Now, the spring is pressed against the friction strip F and the rebound movement retarded. The force of such retardation may be controlled to a certain extent by increasing or decreasing the pressure of the tension spring *h* upon the free end of the friction spring *f* by adjusting the lever *j* in engagement with the ratchet bar K.

Considering the operation of the modification set out in Figs. 3 and 4, let it be assumed that a sudden depression is met with and the arms separate somewhat. The ends of the friction spring 6 will move apart and lessen the clasp or grip of the friction spring on the friction strip 7 which the spring surrounds. But, on the reaction when the arms move toward each other, the violence of the shock is retarded by the closing of the friction spring upon the friction strip. As in the preferred form of this invention set out in Figs. 1 and 2, the force of the friction spring may be varied by the adjustment of the tension spring, in this modification, by the adjustment of the set screw 12 acting upon the tension spring.

Having now described this invention, and explained the mode of its operation, what I claim is:—

1. In a shock absorber, the combination with two arms angularly disposed, of an annular and two circular members connected with the said arms and with each other and being given rotary movements by the said arms, the said members being arranged to form a flat cylindrical box, a friction strip located within the box formed by said circular and annular members and arranged against the annular member, a friction spring arranged against the said friction strip and having one free end and one end attached to said circular members, a tension spring located within said box and having one end bearing against the free end of the said friction spring, and adjustable devices arranged to act upon and to vary the tension of the tension spring.

2. In a shock absorber, the combination with two arms angularly disposed, of members connected with the said arms, said members being arranged one upon the other and having rotary movements when the said arms are moved, one of the said members having a cylindrical wall, a friction strip arranged against the said wall, a friction spring arranged against the said friction strip, said friction spring having one free end and one end connected with one of the said members, a tension spring bearing against the said free end of the said friction spring, and devices for varying the tension of the tension spring.

3. In a shock absorber, the combination with two arms angularly disposed, of an annular and a circular member connected with the said arms and with each other and being given rotary movements by said arms, the said annular member having an inner cylindrical wall, a friction strip located against the said wall, a friction spring arranged against the said friction strip and having one free end and one end attached to the said circular member, a tension spring having one end bearing against the said free end of the friction spring, and devices connected with the said tension spring and with the said circular member and acting upon the said tension spring to vary the tension of the said spring.

In testimony whereof I affix my signature.

CHARLES M. MOHLER.